United States Patent [19]
Minko

[11] Patent Number: 5,963,551
[45] Date of Patent: Oct. 5, 1999

[54] SYSTEM AND METHOD FOR DYNAMICALLY RECONFIGURABLE PACKET TRANSMISSION

[75] Inventor: Jacek Minko, San Jose, Calif.

[73] Assignee: InnoMedia Pte Ltd., Singapore, Singapore

[21] Appl. No.: 08/747,432

[22] Filed: Nov. 18, 1996

[51] Int. Cl.⁶ .................................................. H04L 12/56
[52] U.S. Cl. .......................... 370/356; 370/477; 370/394
[58] Field of Search ..................................... 370/392, 471, 370/473, 474, 389, 394, 465, 468, 477, 252, 352, 354, 356; 371/32–34

[56] References Cited

U.S. PATENT DOCUMENTS

| | | | |
|---|---|---|---|
| 4,949,248 | 8/1990 | Caro ........................................ | 364/225 |
| 5,115,429 | 5/1992 | Hluchyj et al. . | |
| 5,168,497 | 12/1992 | Ozaki et al. ............................... | 371/32 |
| 5,271,000 | 12/1993 | Engbersen et al. ...................... | 370/471 |
| 5,548,593 | 8/1996 | Peschi ....................................... | 370/394 |
| 5,604,737 | 2/1997 | Iwami et al. ............................. | 370/352 |

FOREIGN PATENT DOCUMENTS 0 214 020   3/1987   European Pat. Off. .

OTHER PUBLICATIONS

Casner et al., "First IETF Internet Audiocast" Computer Communication Review, pp. 92–97, Jul. 1992.
Ramachandran Ramjee, Jim Kurose and Don Towsley, "Adaptive Playout Mechanisms for Packetized Audio Applications in Wide–Area Networks," IEEE Infocom '94, vol. 2, Jun. 12, 1994, pp. 680–688.
Author unknown, "5. LLC Elements of Procedure," IEEE Std 802.2—1985, XP–002059239, Local Area Networks, Logical Link Control, pp. 44–55.
Jean–Chrysostome Bolot, Hugues Crepin and Andres Vega Garcia, "Analysis of Audio Packet Loss in the Internet," 5ᵗʰ international Workshop On Network and Operating System Support For Digital Audio and Video, Apr. 1995, pp. 154–165.

*Primary Examiner*—Chau Nguyen
*Attorney, Agent, or Firm*—Graham & James LLP

[57] ABSTRACT

A method and system for packet-switched voice communication between two remote points over a randomly connected network such as the Internet includes use of a first index to serialize the outgoing packets, and a return index to confirm receipt. In the event the return index indicates an unacceptable number of packets have not been received at their destination within a limited time, the system causes at least some of the lost packets to be retransmitted, allowing a more complete recreation of the sender's voice of the random connection.

19 Claims, 8 Drawing Sheets

SYSTEM AND METHOD FOR DYNAMICALLY RECONFIGURABLE PACKET TRANSMISSION

RELATED APPLICATION

This application incorporates by reference the following applications, filed on even date herewith and commonly assigned:

U.S. patent application Ser. No. 08/751,876, entitled Concatenation Compression Method, Jing-Zheng Ouyang and Nan-sheng Lin, inventors; and U.S. patent application Ser. No. 08/747,433, entitled ISDN Terminal Adapter Using Digital Signal Processor, James Huang, inventor.

FIELD OF THE INVENTION

The present invention relates to communications methods, and more particularly relates to packet switching techniques for communications.

BACKGROUND OF THE INVENTION

The telephone has existed as a primary means for communications throughout most of the 20th century. Telephone communications are characterized by point-to-point connections, in which a caller is connected to a receiver by, essentially, a dedicated channel through various switching systems. The channel can be any of a variety of media, including copper wire, optical fiber, satellite, cellular, and so on. The nature of such communication is well known in the art.

More recently, alternative forms of communication have developed. In particular, the communications network generally referred to as the Internet has come rapidly to prominence. Internet communications generally involve transfers of digital packets of information, which are transmitted between a sender and a receiver through one or more computers referred to as servers interconnected by high speed data links. Internet communications, however, can be distinguished from conventional telephone communications in that Internet communications typically are not point-to-point, but may be rerouted from server to server during file transfer.

Quite recently, techniques have been developed to provide at least rudimentary real-time voice communications across the Internet between suitably configured computer systems—i.e., a "telephone call" via the Internet. Such techniques include, typically, the use of a conventional telephone channel from the caller's computer system to its local Internet service provider, across the Internet to the local service provider for the receiver, and across a conventional telephone channel from the receiver's Internet service provider to the receiver's computer system. At least some of the techniques are believed to involve digitizing of the audio and formatting the digitized signal into packets, followed by packet transmission from the caller to the receiver. To maximize transmission speed, the UDP communications protocol is typically used, although this protocol trades off speed for reliability of communication. Suitable computers may include a Pentium-based system having a suitably sized hard disk, 28.8KBaud modem, and a sound card.

Unfortunately, virtually all voice communications techniques currently used on the Internet result in significant signal data loss or delays, resulting in unacceptably poor audio quality such as lost words or parts of words or noticeable delays between speakers. At least in part, this poor audio quality is due to lost or unduly delayed packets, such that the digitized signal cannot be reconstructed at the receiver's system. There has therefore been a need for a communications technique which permits audio signals to be transmitted over the Internet with acceptable audio quality.

SUMMARY OF THE INVENTION

The present invention overcomes many of the limitations of the prior art by implementing a packet switching technique for full duplex digital voice communications across the Internet which is dynamically reconfigurable, in response to the received information, to resend dropped packets in a sufficiently timely manner that data loss is minimized. This results in a realistic and acceptable quality of real-time voice communications which enables users to carry on "Internet telephone calls," or other communications (including calls involving conventional telephones) in which at least a part of the communications link uses network-linked computers.

The present invention works with any communications channel having sufficient bandwidth to permit dynamic reallocation of resources to resend dropped packets within a specified period. One acceptable compression method is disclosed in the aforementioned U.S. Patent Application directed to Concatenation Compression Method. In addition, the present invention works with either analog modems or ISDN terminal adapters. One example of an acceptable ISDN terminal adapter is shown in the aforementioned U.S. patent application directed to ISDN Terminal Adapter Using Digital Signal Processor.

To achieve the foregoing results, the method of the present invention includes establishing a verified control channel between the sender and the receiver. First, a verified control channel (for example, through use of the TCP protocol) is established. Then, after appropriate handshaking, a second, unverified communications channel is established, for example by using the UDP communications protocol. Next, a dual packet indexing system is established which takes advantage of the full duplex nature of the communications. By using full duplex communications, packets are continuously exchanged from each side, such that both sides are transmitting and receiving concurrently.

As the first indexing step, each packet queued for transmission by the sender is assigned a sequential index number which is included in the header of that packet. When that packet is received at the receiver, the receiver retrieves the index number of that and incorporates it as a "return index" into the next packet being queued for transmission from the "receiver" back to the "sender", along with the packet index of the packet being transmitted from the "receiver" to the "sender". Thus, packet transmission proceeds bidirectionally, with a first portion of the header indicating the index of the outbound packet and a second portion of the header indicating the index of a received packet. At the receiver end, the incoming packets are stored in a queue pending reassembly of the audio portion, which otherwise proceeds in a conventional manner.

In some instances one or more packets may get lost between the sender and the receiver. Typically, although not necessarily, an entire data burst—usually three or four packets—will get lost. In such an instance, the return index numbers will skip those lost packets. One important feature of the present invention is the method by which such lost packets are restored.

By tracking the index number of incoming packets, the system of the present invention recognizes that the packet sequence has been broken and that specific packets have been lost. The sender is then caused to retransmit the missing packets by adding at least one missing packet to the packets queued for transmission, creating at least double packets. The connection speed, together with the degree of compression, will combine to determine the maximum number of packets which may be piggybacked. In most instances, the second transmission of the dropped packet is received successfully, such that the packet may then be inserted into the receive queue. By causing the retransmission to occur within a sufficiently small window of time relative to the originally transmission, the packet may be inserted into the queue quickly enough to permit the entire audio signal to be reconstructed.

In a presently preferred embodiment, the receiver detects the loss of incoming packets and signals the sender to begin transmitting backup packets. The sender then continues transmitting backup packets until the receiver determines that no packets have been lost for a sufficiently long period that it signals the sender to stop sending backup packets. Alternatively, the sender can be configured to respond to the return index received from the receiver to recognize that packets have been lost and to enable the sending of backup packets, although this may cause additional issues since the two channels (send and receive) are typically not equal in performance in the network environment. (For example, in some instances, communication in only one direction is degraded. If communications deteriorate in both directions, the lost packets index will add up due to the time required for the index to travel round trip, which may cause the sender to have difficulty differentiating incurred losses.) Various alternatives also exist for determining when the sending of backup packets may be discontinued; in addition to the technique described above, which alternatively may be controlled by the transmitter, the system may be configured only to send the average number of packets lost before ceasing sending additional packets. For example, if an average number of lost packets is three or four, the system may be configured to automatically send four backup packets once a packet is identified as lost, and then to stop sending backup packets until the next loss of a packet occurs. Such variations and alternatives may not be as efficient in all circumstances; for example, in the event that the round trip time is longer than the average packet loss time, it may be more difficult to correct for lost packets with the preconfigured system described above. This may mean that, for some corrections, it may not be possible to respond timely to a request from the receiver.

In addition, thresholding may be implemented before determining to start sending backup packets. It has generally been determined that, at least for voice communications, loss of a single packet does not materially degrade the quality of the voice reconstructed at the receiver side. Thus, in at least some embodiments it may be desirable not to begin sending backup packets until some percentage of single degradation occurs. However, to ensure signal quality, it is presently believed useful to provide a certain amount of hysteresis, such that a degradation of, for example, seven percent of the signal may cause the sending of backup packets to be initiated, while the signal quality must be improved to, for example, no more than four percent degradation before sending of backup packets is stopped. In addition, hysteresis may also be applied to the times over which the quality of the signal is monitored; for example, packet recovery may be started when an unacceptable deterioration has existed for a time period $\chi$. However, once the signal improves, the signal must remain at the acceptable quality for a time period $\chi+\epsilon$. Such an approach balances quality over speed, and other approaches may be acceptable in some situations.

These and other details of the present invention may be better appreciated from the following detailed description of the invention, taken in combination with the accompanying Figures.

THE FIGURES

DETAILED DESCRIPTION OF THE INVENTION

Figure 1A:
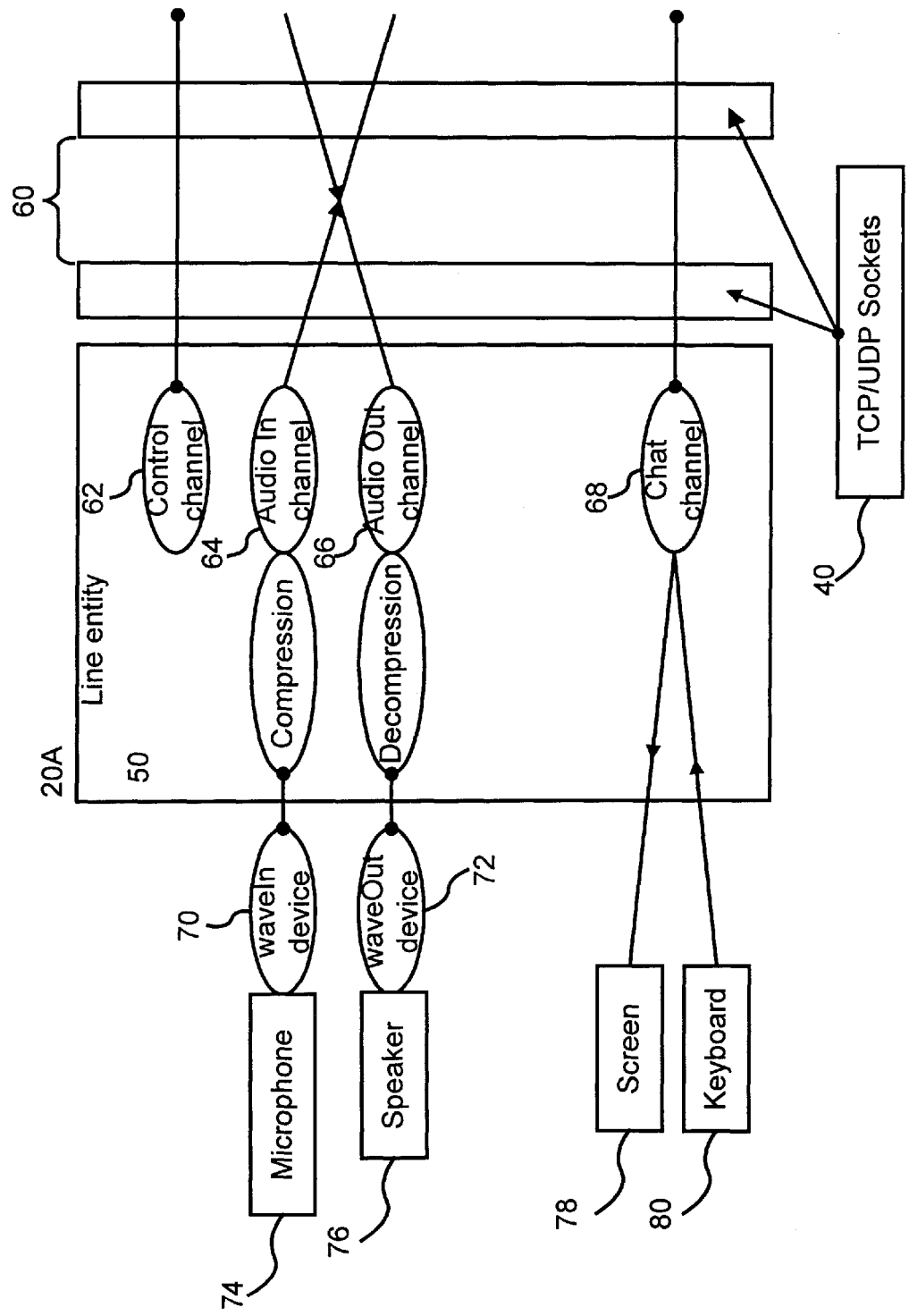
FIG. 1 shows in block diagram form the overall architecture of the system of the present invention.
Figure 1B:
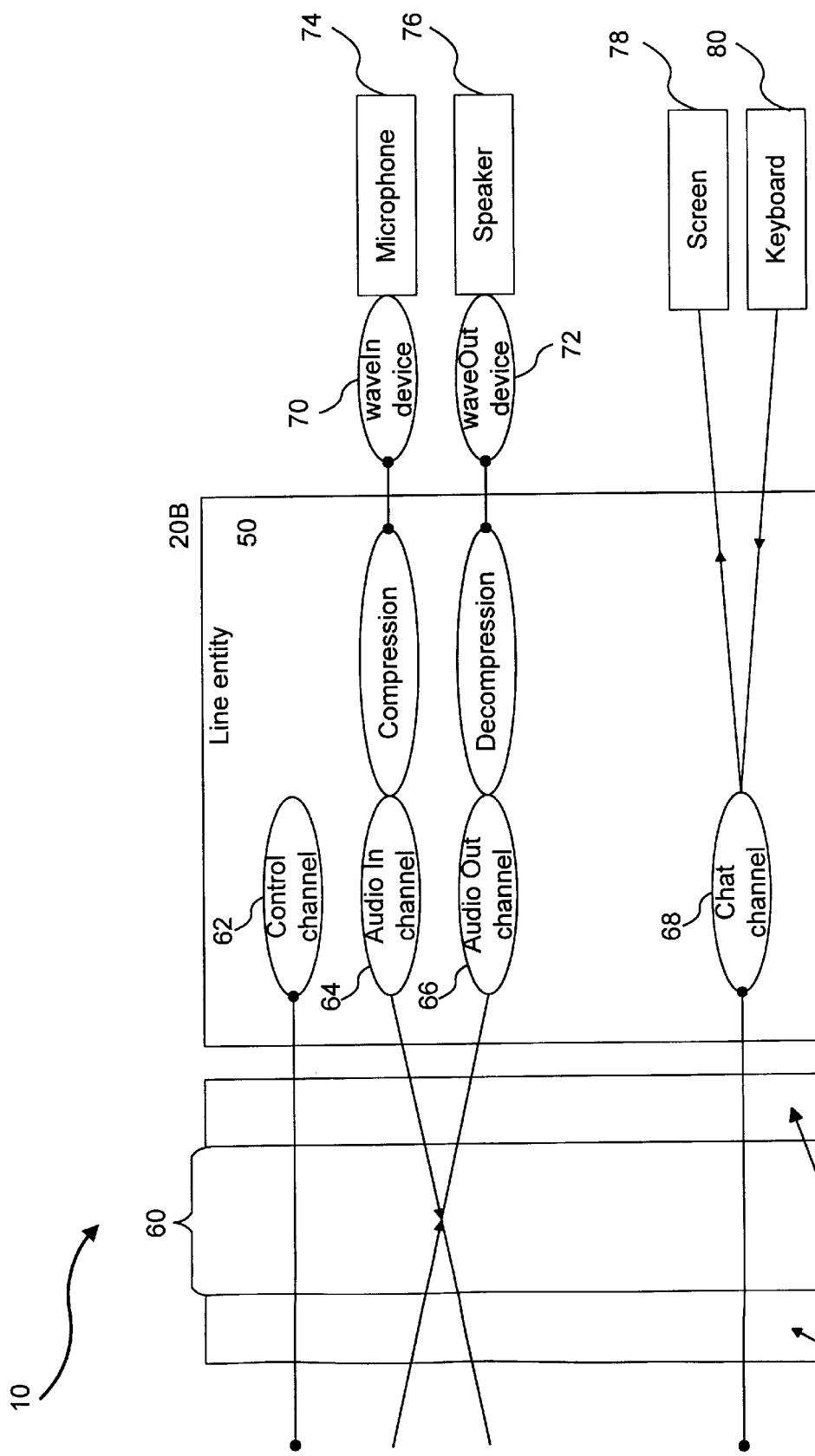

Referring first to FIG. 1, a simplified diagram of a communications systems indicated generally at 10 may be seen to include a local sender/receiver unit indicated generally at 20A which communicates with a remote sender/receiver indicated generally at 20B through any suitable media 40 such as, for example, TCP/UDP sockets carried via conductive cable, optical fiber, or wireless. The sender/receivers 20A and 20B may each include a line entity such as modem or terminal adapter 30 to provide either an analog or digital interface between the media 40 and data processing portion 50 of the sender/receivers 20A and 20B. Although the following description primarily references audio signals, it will be appreciated that, in at least some instances, the present invention may be used with video signals, and reference hereinafter to audio is to be understood as for convenience only, and not limiting.

One suitable terminal adapter is shown in U.S. patent application Ser. No. 08/751,876 entitled ISDN Terminal Adapter Using Digital Signal Processor, James Huang, inventor, filed on even date herewith and commonly assigned, which is incorporated by reference, although an analog modem such as a U.S. Robotics Sportster 33.6 or other analog modem is also acceptable. The minimum modem speed acceptable depends on a combination of both compression and quality of connection; in some instances a modem operating at 14.4 Kbaud may be acceptable. A suitable data processing portion is a Pentium®-based PC running a Microsoft Windows® operating system, although a system based on an 80486 processor operating at 66 MHz has also been found to work. One acceptable form of compression is described in U.S. patent application Ser. No. 08/747,433, entitled Concatenated Compression Method, J. Ouyang et. al, inventor, also filed on even date herewith and commonly assigned with the present application, and incorporated herein by reference.

In operation, the system of the present invention may be thought of in some respects as a plurality of specialized data exchange channels. For some types of data exchange, speed and low latency are paramount, while for other types of data exchange reliability is required and latency is not a significant factor.

In initializing the system, the local unit 20A contacts the remote unit 20B through a conventional port address and socket. As soon as initial handshaking is completed, the receiver creates an "information channel" for the purpose of establishing a connection between the local and remote sites. The information channel permits the users to exchange information such as who is calling, available compression schemes, connection speed, and so on. Once this data has been successfully exchanged, and the receiver is willing to proceed, a "line" 60 is established, where "line" is understood to be all resources necessary to carry out the connection. The line, in turn, has the ability to establish multiple exchange paths as necessary to facilitate communications between the entities 20A and 20B, including a control channel 62, audio in channel 64, audio out channel 66, and chat channel 68. Other channel types can include file, video, or other data as needed. In addition, the line 60 also has access to a waveIN device 70 and a waveOUT device 72, both of which may be thought of as a low level representation of a "wave recorder" and a "wave player." The waveIN device 70 and waveOUT device 72 facilitate recording and playing back the parties' voices in a substantially similar manner, when used together with the associated microphone 74 and speaker 76.

However, because of the differing requirements for data exchange on the various channels, the protocols used with each channel vary. The control channel 62 is required to maintain reliable communication between the parties, and thus runs, in an exemplary embodiment, the TCP protocol. The control channel 62 performs essentially five functions: (1) closes all connections between the parties, to shut down all communications between them; (2) activates wave playback and recording, including trying to synchronize the exchange of audio data; (3) places a connection on hold, or resumes it; (4) changes encoder parameters, such as a change in compression schemes for packet recovery, as discussed in greater detail hereinafter; and (5) monitors live status to ensure continued communication with the other party.

Figure 2:
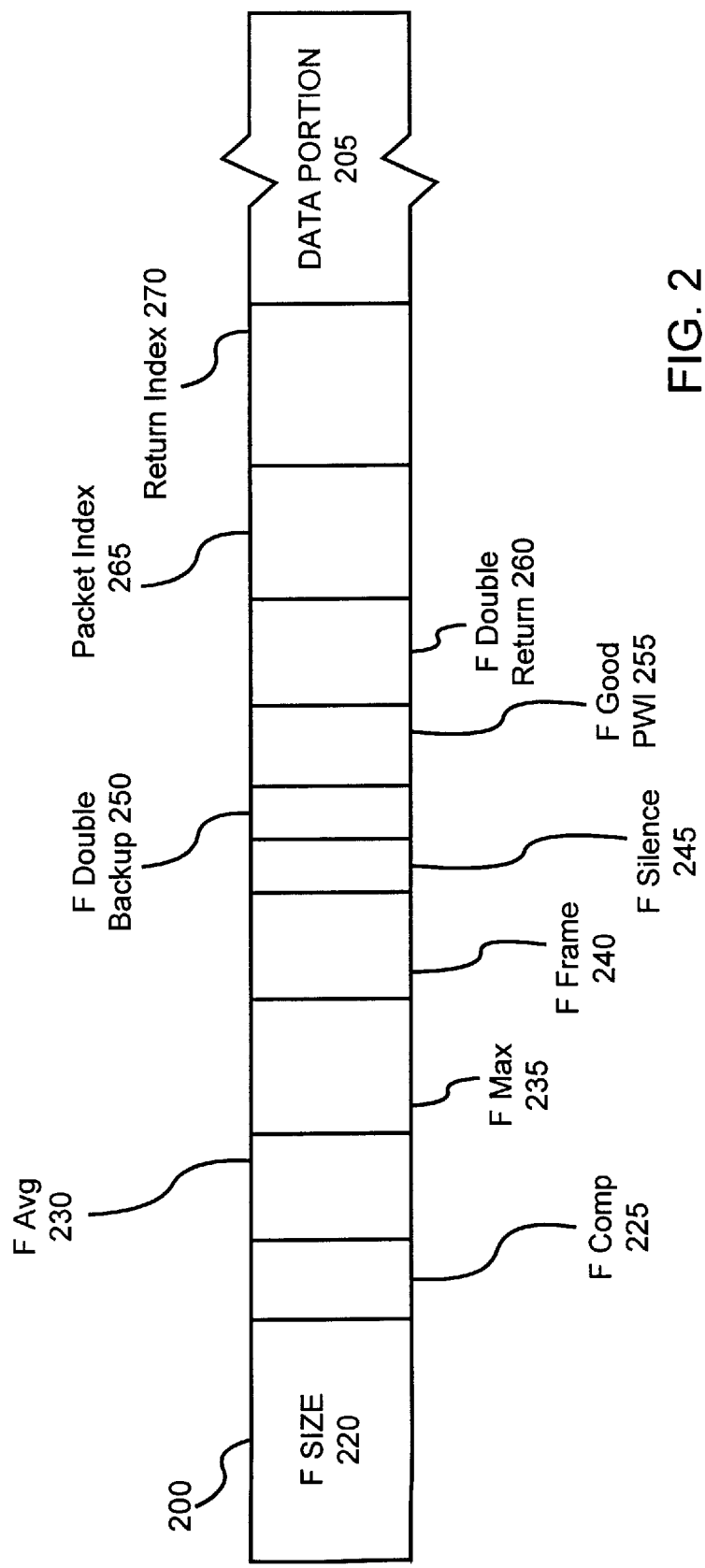
FIG. 2 shows the data structure of a packet in accordance with the present invention.

The audio in channel 64 and audio out channel 66 together comprise a voice channel. The voice channel requires low latency and channel allocation and utilization is key to successful operation. The sole purpose of the channel is to pass packetized audio information between the parties, where each packet is configured as shown in FIG. 2. To maximize channel utilization and minimize latency, the UDP protocol is used. The chat channel 68 simply passes typed text between the parties using the keyboard 78 and monitor 80, and therefore any slow but reliable method is acceptable. Thus, a TCP connection is typically implemented.

In addition, a file transfer channel is implemented, but can only be used when no audio or other high priority information needs to be transferred since a file transfer could block the audio data. The file transfer channel is controlled by the line entity.

Referring next to FIG. 2, the data structure of a packet in accordance with the present invention can be better understood. The packet typically includes a header portion 200 and a data portion 205. The data portion may vary greatly in size, from zero bytes to $2^{14}$ bytes, and forms the latter portion of the packet. However, most data portions are markedly smaller, since the size of the data portion directly impacts how long it takes to transmit a packet. Silence is typically represented as a single byte, while signals of greater volume comprise more bytes. In addition, or in some instances alternatively, a silence flag may also be set in the header to indicate the silence condition.

The header portion 200 typically includes a plurality of fields for managing the communications and data being supplied. In an exemplary embodiment, the first field 220, $F_{size}$, may be on the order of fourteen bits long, and indicates the amount of data to follow in data portion 205. Next, a two bit field 225, $F_{comp}$, represents the type of compression used to encode the packet. The system is configured to select dynamically among various compression algorithms, and the encoder side uses this field to advise the receive how to decode the packet. The next field 230, $F_{AVG}$, represents the average WAVE value of the data portion 205, while the following field 235, $F_{MAX}$, represents the maximum WAVE value of the data portion. The $F_{AVG}$ value is used in the event that too many packets start to accumulate. By observing the average of the various packets, packets with nearly zero value can be discarded without significant signal loss. This permits improved throughput by the system, although at some cost in quality. $F_{MAX}$ is used to show to the user current volume, and is also provided in an attempt to save CPU cycles. Both fields 230 and 235 are, in an exemplary embodiment, four-bit fields.

Thereafter, another four-bit field 240, or $F_{FRAME}$, is provided. $F_{FRAME}$ indicates the number of compression frames in the current packet; in an exemplary embodiment, the compression algorithm may be GSM or similar, such that the field $F_{FRAME}$ indicates the number of GSM frames in the packet. A silence field 245, or $F_{SILENCE}$, is also provided, and is typically only a single bit; packets in which no voice (or in which the audio is sub-threshold) is heard may have this bit set, in which case a preset value is added at the receiver during reconstruction of the audio portion. This may be implemented by sending the packet designation to a "silence buffer" for retrieval at the appropriate time.

Another single bit field 250, $F_{DOUBLE}$, is also preferably provided. The single bit of the field 250 is set when a backup packet is being added to data of the present packet, in a manner described in greater detail hereinafter. Following the $F_{DOUBLE}$ field, another single bit field 255, representing a "good PWI" flag. This flag simply determines if the packet in the outgoing queue was successfully sent, in case there is a need to send a backup packet. Thereafter, a single bit field 260, representing a double return index field, is preferably provided, and indicates that more than one packet was received from the sender before the receiver could send off a packet with a return index. Setting this flag permits all packets starting with the return index to be marked as delivered once the return index arrives at the sender.

Next, a packet index field 265, typically comprising a byte, is provided. The packet index indicates the location of the current packet in numerical sequence. By use of eight bits to indicate sequence location, a total of two hundred fifty-six packets may be indicated before the index numbers repeat. It will be appreciated that a repeat after 256 packets is acceptable as long as the voice data represented by that packet index in an earlier cycle has already been reconstructed. Since, in the currently preferred embodiment, only five to ten packets are sent per second, such a condition should occur only extremely rarely. Finally, the last field 270 of the header portion 200 represents a return index field, and is also a byte since it is filled with the index number of the recently arrived packet. Because of full duplex operation, the "send" index for one system will normally be at a very different value than the send index for the other system. In addition, the "send" index from one direction corresponds to the received index from the other direction.

Figure 3:
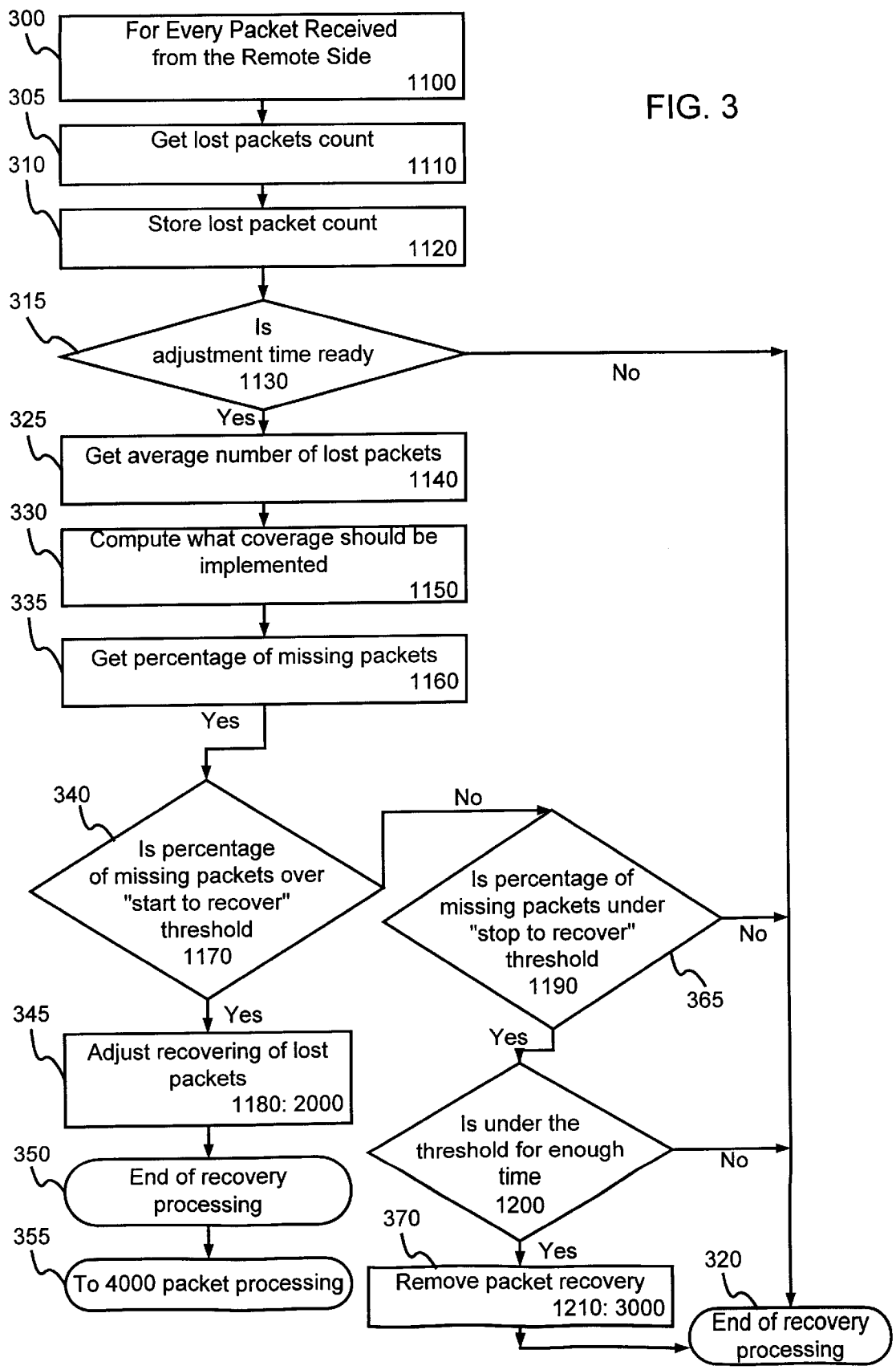
FIG. 3 shows in flow diagram form an overall view of buffer processing in accordance with the present invention.

Referring next to FIG. 3, the overall handling of packets received from the remote device may be better appreciated. In general, every packet delivered to the receiver has its index in the packet header, or packet index field 265. The receiver side stores the index of the previously arrived packet and, when the next packet arrives, compares the index of the newly arrived packet with that of the prior packet. If no packets have been lost, the index will differ only by one. If the difference is more than one, the receiver assumes a packet loss has occurred, takes it as a lost packet count, and stores it. Next, the index of the last previously received packet is replaced by the current one. A check is also made to determine if the index difference is not greater than half of the index span, or half of 256 in the exemplary embodiment. If the difference is greater, it is generally fair to assume the packet is out of place and should be discarded.

The process begins at 300 and advances to step 305 where a "lost packets" index is retrieved from a memory buffer and updated according to the current packet index as described above. The process advances to step 310, where the newly updated lost packet index is stored again in a suitable memory buffer (not shown).

The process then advances to step 315, where a check is made to determine whether it is time yet to evaluate the average signal quality, which will determine whether the packet recovery process should be initiated. The purpose of this step is to establish a time threshold for evaluating the "lost packet" data. Essentially, the "adjustment time" is set at a predetermined period, although in some embodiments that period may be adjustable by the user. The number of lost packets is then checked only periodically in accordance with that period, and the number of lost packets is determined as a percentage of the total number of packets. If the percentage of lost packets—which can be seen to correspond to signal degradation—exceeds a predetermined threshold, the recovery process is initiated. If it is not, the time threshold is reset and the process continues. From the foregoing, it will be appreciated that two conditions are required to initiate packet recovery: time, and line condition. As will be discussed further hereinafter, to avoid oscillation into and out of the recovery process, some hysteresis is preferably provided on both conditions—that is, on the time and the line condition. In general, the presently preferred philosophy for applying such hysteresis is preservation of the quality of the signal, and thus "turning on" recovery occurs more quickly—both as to time and line condition—than "turning off" recovery.

As an alternative to resetting the time threshold, a sliding window could be implemented. In such an instance, hysteresis could readily be maintained by arranging, for example, one window to check for a bad line condition, and a second to check for a good line condition, with the first window shorter than the second such that recovery turned on more quickly than it turned off.

Turning to the particular features of FIG. 3 which implement the above discussion, if the "adjustment time" counter has not yet completed its count, the process advances to step 320 and returns. However, if the adjustment time count has reached the preset time, the check at step 315 returns a yes, and the process advances to step 325. Steps 325, 330 and 335 compute the degradation of signal quality by calculating, as a percentage of total transmitted packets, the number that have been lost and the average cluster size that the system will use for packet recovery. In this context, a cluster is a plurality of lost and substantially contiguous packets. As noted previously, a typical data loss comprises a burst of several packets, typically three or four, and these lost packets form a cluster. In a presently preferred embodiment, it is not necessary to recover every packet within a cluster to provide acceptable voice quality. Instead, recovering approximately 80% of the lost packets has been found sufficient to maintain quality. For example, if during a time-out the system detected that packets were lost five times, and the cluster sizes of those packets were one, two, three, four and five packets per cluster, 80% coverage would mean setting the system to recover up to four packets per cluster. Thus, up to four packets lost in a row could be completely recovered. In at least some embodiments, each of these thresholds may be adjusted by the user.

After the percentage has been calculated, the process advances to a check at step 340, where the percentage of lost packets is compared to a threshold value. The threshold value is preset to provide a balance between the need for throughput and the need for fidelity of the reconstructed sound, and may in part be guided by empirical evidence of what makes an acceptable output to the receiver. In an exemplary embodiment, a threshold of 7% has been established and found acceptable, although this threshold is preferably set to be adjustable by the user.

Thus, at step 340, if the percentage of lost packets exceeds the threshold, the process branches at step 345 and recovery of lost packets is begun. This branch of the process will be described in connection with FIG. 4. Once the recovery process of FIG. 4 completes, that branch returns and recovery processing ends at step 350, after which the process advances to packet processing, shown in FIG. 6.

If, on the other hand, the result at step 340 was a "no", the process advances to step 360. At step 360, a check is made to determine whether the percentage of missing packets is less than a predetermined threshold. To avoid dithering between beginning packet recovery and turning off packet recovery, some hysteresis is provided by setting the threshold for turning recovery off to a lower "lost packets" percentage (i.e., better signal) that the threshold for turning recovery on. In an exemplary embodiment, a four percent threshold has been found acceptable for ceasing packet recovery, as compared to a seven percent threshold for turning recovery on.

If the percentage of lost packets is still higher than the "stop recovery" threshold, the check at step 360 yields a NO and the process advances to step 320. However, if quality is acceptable in comparison with the threshold, the process advances to step 365 where the time over which the quality has been acceptable is compared to a time threshold. If the quality has not been acceptable for sufficiently long, the process advances to step 320. However, if the quality has been acceptable for sufficiently long, the process advances to step 370 to remove the packet recovery process. This portion of the process is described in detail hereinafter in connection with FIG. 5.

Figure 4:
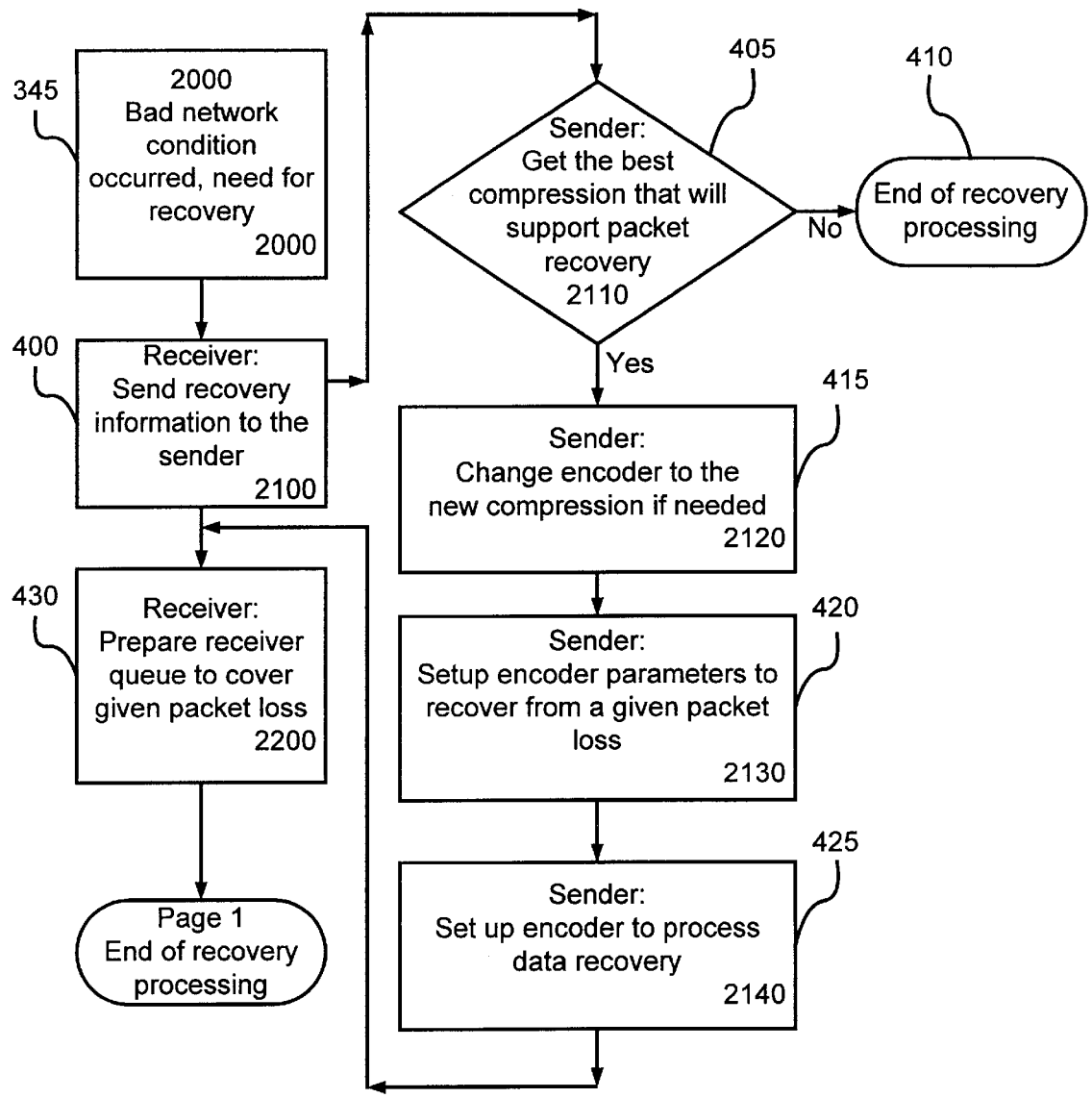
FIG. 4 shows in flow diagram form the process for adding one or more backup packets for recovery of lost packets.

Referring next to FIG. 4, the process for initiating the packet recovery process can be better understood. As noted previously, the process represents the branch at step 345 in FIG. 3.

The packet recovery process begins at step 400 by sending recovery information to the remote sender. In at least an exemplary embodiment, the recovery information typically need only include the length of the cluster that should be covered. However, this information is preferably sent using the TCP-control channel rather than the UDP channel, for greater reliability. The process then advances in two ways. First, the forwarding of recovery information to the sender in step 400 causes the sender, at step 405, to identify the compression algorithm best suited to packet recovery. In an exemplary embodiment, the system is permitted to select among a variety of compression methods, and to implement for any sequence whatever compression method is selected in accordance with the selection criteria. Essentially, the compression method can be adjusted to give the best fidelity that can be used at the current connection speed.

In the event no suitable compression method is available, the check made at step 405 returns a NO, and recovery processing ends at step 410. However, this should occur only rarely, such as when there is a mismatch between the communications speed and the available compression algorithms. The normal result will be the selection of a compression method, such that the process advances to step 415. At step 415, the Sender changes the encoder to the new compression algorithm, if needed, and the process then advances to step 420. At step 420 the Sender sets up encoder parameters to begin retransmitting the lost packets to cause the data to be recovered, including recycle buffer queue size and the array of indexes. The recycle buffer queue size must be large enough to allow packets that have already been sent to be kept until a need for their retransmission has been determined; i.e., to make sure the packet is still there if it is needed. The array of indexes simply maintains a record of which packets successfully arrived, so that the sender can make some judgments about the need to send a backup packet. When the system is not operating in recovery mode, these two features are typically inactive. In addition, the index is used to help ascertain whether a particular packet needs to be retransmitted. When it is time to send a packet, the array associated with the sent packets is looked up and, if there is a need to send a backup packet, the "double packet" field is set in the header.

Once the encoder parameters have been set to start recover from a given packet loss, the process advances to step 425, where the encoder is set to the proper state to enable it begin process packets for data recovery; that is, after all the foregoing parameters are set, the encoder is now in the state to send backup packets. At the same time, the process advances to step 430 at the Receiver end, where the receiver queue is prepared to receive the retransmitted packets. It should be noted that the foregoing are two independent paths of operation. The receiver side sends a message to the encoder side to request encoder changes; but in addition, the receiver proceeds to set up its own queue without waiting for a response from the sender.

The operation of the bit array, or index array, depends on the operational conditions of the system. In some instances, the return index arrives too late to be helpful, and backup packets are sent continuously. This situation occurs when the time delay for a round trip is less than the time for transmission of a cluster size capable of being recovered. In this regard, if the time it takes the index information to make a round trip from the sender to the receiver and back to the sender is longer than the time it takes to send a cluster of, for example, four packets, the return index information will arrive too late to be helpful. In this case, the return indexes are ignored because they arrive to late to help with the decision. As a result, backup packets are always sent.

However, where the round trip time is less than the cluster cover time, an acknowledge is received by the sender before a backup packet needs to be sent. In this situation, the acknowledge information is stored in the bit array, and that array information is checked before the sender adds backup packets to the new information. If the packet was already received, the backup packet is not sent.

Figure 5:
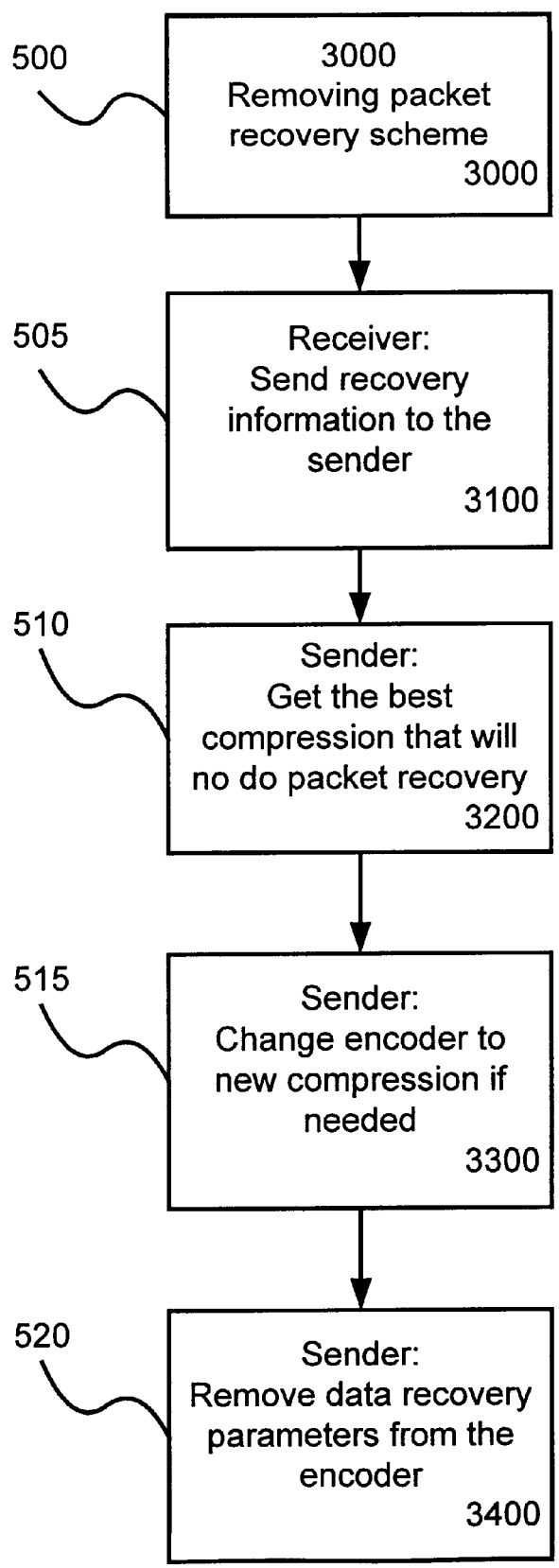
FIG. 5 shows in flow diagram form the process for ceasing the retransmission of backup packets.

Referring next to FIG. 5, the process for removing packet recovery can be better understood. The process begins at step 500, to which step 370 branches. The process then advances to step 505, where the receiver sends a "stop recovery" message to the sender. The process then advances to step 510 on the sender side, where the sender evaluates the available compression methods based on maximizing throughput and reliability at the connection speed, and selects the best available method given that additional packets will no longer be present.

The process further advances to step 515, where the encoder is changed to the newly selected compression method, and finally advances at step 520, where the sender removes the data recovery parameters from the encoder. The process then returns to step 320 for handling of the next received packet.

Figure 6:
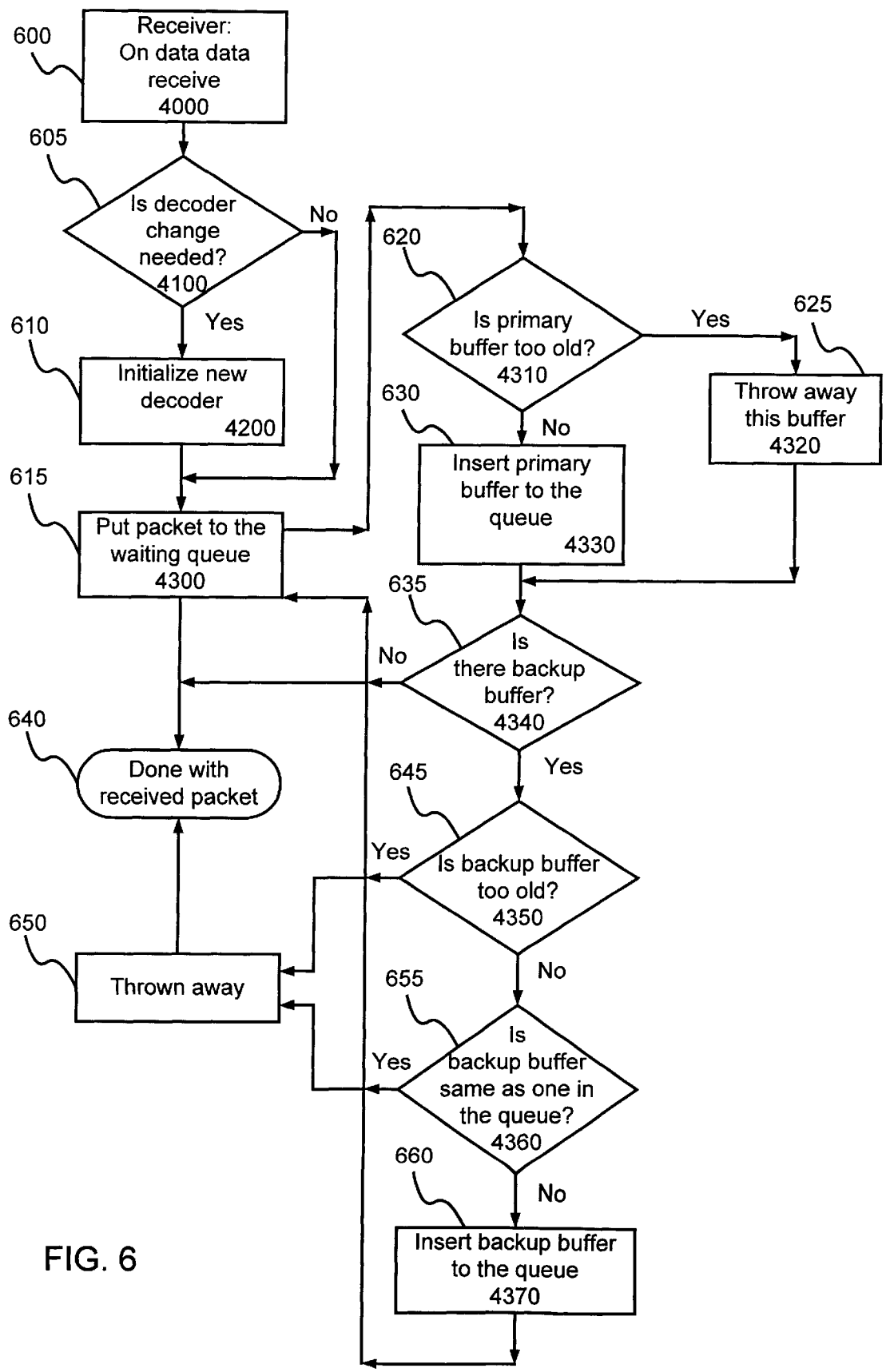
FIG. 6 shows in flow diagram form the handling of incoming data at the receiver side.

Referring next to FIG. 6, the manner in which the receiver processes incoming data can be better understood. The process starts at 600 and advances to step 605, where a check is made to determine whether the compression method used by the sender to encode the incoming packets matches that at the receiver. If a change is the decoder is needed, the process advances to step 610, where a new decoder is initialized to match the sender's encoder. If no change in the decoder is needed, a no response causes step 610 to be bypassed.

Next, the process advances to step 615, and the packet is placed in the waiting queue for further evaluation. In the event that a backup packet arrived with the primary packet, both packets are placed in the waiting queue for further examination. At this point, a series of steps are performed to determine whether the primary packet or the backup packet is appropriate for data playback. For convenience, the steps 620 through 660 are shown as separate steps, although in a preferred embodiment they represent a series of checks performed as part of step 615.

The process moves to step 620 and checks to determine whether the primary packet is too old to be relevant to the signal currently being reconstructed. In this regard, the check performed at step 620 essentially can be used to define a window of time around the current primary packet by defining the check in terms of the current range of packet indexes in the queue, plus or minus a threshold value. If the index of the primary packet falls outside the acceptable range, it is necessarily too old and can be discarded. Thus, if the check at step 620 results in a yes, the primary packet is discarded at step 625. However, if the primary packet falls within the acceptable range, the packet is inserted into the queue at step 630.

After the primary packet has either been discarded or placed in the queue for further processing, the process advances to step 635 and determines whether a backup packet exists. If not, the process returns to step 640, which concludes this portion of the process. If so, the backup packet is examined at step 645 to determine if it falls within the acceptable window. If not, it is discarded at step 650 and the process again forwards to step 640.

If the backup packet is within the acceptable window, the process advances to step 655, where the backup packet is examined to determine if it is the same as one already in the queue. If yes, the process forwards to step 650 and the packet is discarded. If not, the backup packet is inserted into the queue at step 660. The process then returns to step 640, after which the processing described in connection with FIG. 7 can proceed.

Figure 7:
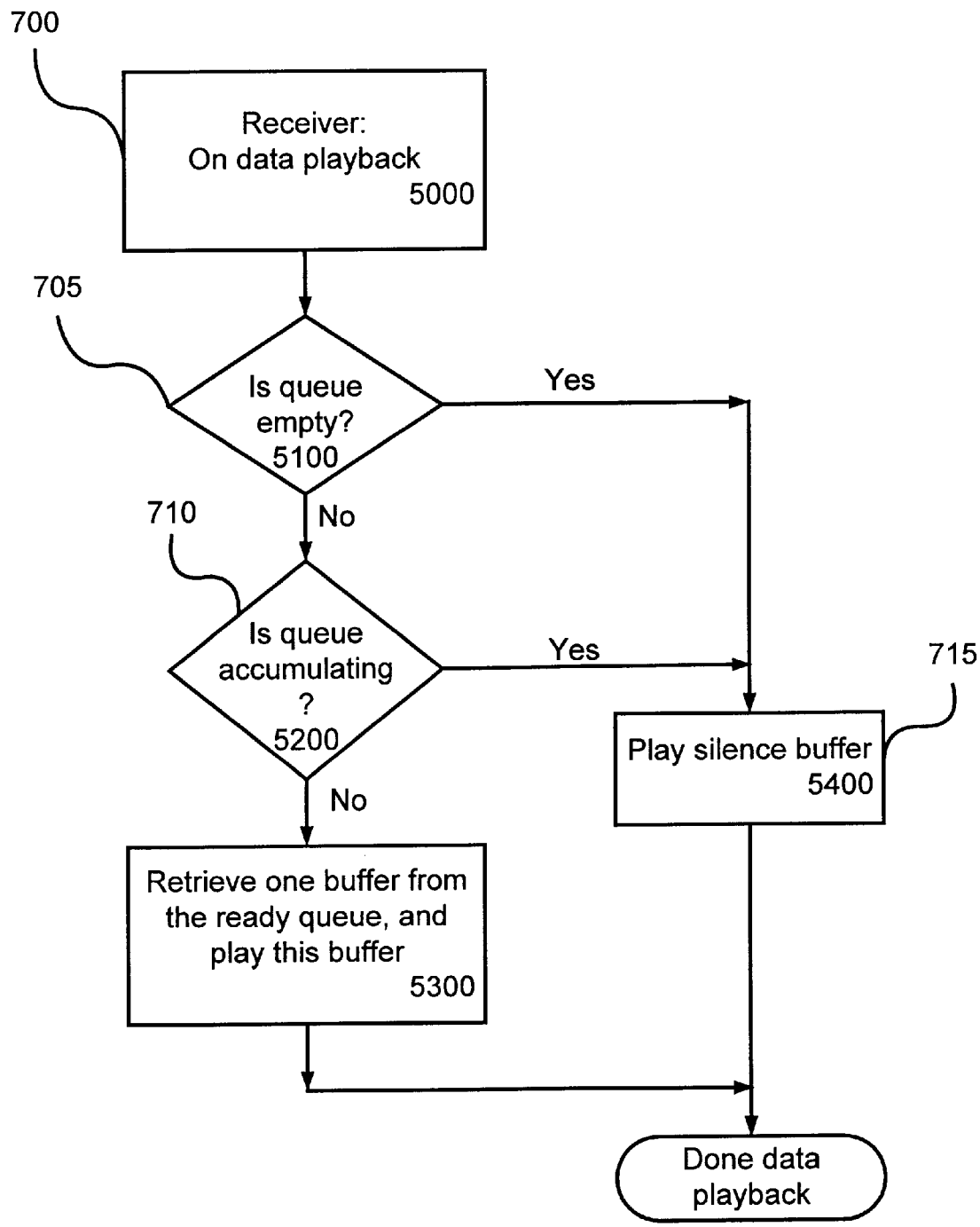
FIG. 7 shows in flow diagram form a generalized view of data reconstruction to enable playback.

Referring next to FIG. 7, the data playback process can be better understood. The process begins at step 700, and advances with a check at step 705 to determine if the queue is empty. If the queue is not empty, a further check is performed at step 710 to determine if the queue is accumulating. If either the queue is empty, or the queue is accumulating, the process advances to step 715, and plays the silence buffer. If the queue is not accumulating, one packet is retrieved from the queue and played, and the process returns. The point behind this approach is basically to double buffer the playback algorithm, such as a "waveOUT" process supplied by various operating systems. The purpose in double buffering is simply to smooth out the speech jitters which would occur in using a single buffer, since there would always be a delay between learning that the buffer was empty and supplying the buffer with additional data.

From the foregoing, it will be appreciated that a new and novel technique for voice communications over a randomly connected network such as the Internet has been disclosed, in which a dynamically reconfigurable packet switching technique provides significant advantages in fidelity and performance. Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A system for communicating digital audio signals over a randomly connected link between two transceivers, comprising:

first and second sender/receiver units communicating with each other via a random network connection and configured for both transmitting and receiving data packets representative of audio information, each packet containing an index to uniquely identify the packet;

means for causing the first sender/receiver unit to start a counter and an adjustment timer to determine a number of lost packets for a specified time period, if a difference between the index of a new packet and the index of a last previous packet is greater than one; and means for prompting the second sender/receiver unit to retransmit to the first sender/receiver unit at least some of the data packets when the number of lost packets for the specified time exceeds a predetermined threshold.

2. A method for recovering lost packets representing audio data in a network environment comprising steps, performed by a receiving station in the network, of:

receiving a new audio data packet from a sending station in the network, wherein the new packet contains a packet index, wherein the packet index is a numerical value that identifies the order of transmission of the new packet;

storing a packet index of a last previous packet in a memory;

comparing the stored packet index and the packet index of the new packet to yield a difference;

if the difference is greater than one, starting an adjustment timer and a the counter to determine a number of lost audio packets for a specific period of time;

initiating a lost audio packet recovery procedure, if the adjustment timer and the counter show that the number of lost packets counted by the counter exceeds a predetermined threshold for the number of lost audio packets for the time specified by the adjustment timer; and forwarding lost audio packet recovery information to the sending station, as part of the lost audio packet recovery procedures.

3. The method as recited in claim 2, further comprising the step of:

if the difference exceeds one half the span of possible packet index values, considering the newly received audio packet out-of-sequence and discarding the newly received packet.

4. The method as recited in claim 2, further comprising the step of:

if the adjustment timer reaches the specified time and the count is under a predetermined threshold for a predetermined period of time, terminating the lost audio packet recovery process.

5. The method as recited in claim 2, further comprising the step of:

if a number of lost audio packets counted by the counter during the time specified by the adjustment timer and is under a predetermined threshold, terminating the lost audio packet recovery process.

6. The method as recited in claim 2, further comprising steps, performed by the receiving station, of:

sending a request to the sending station for encoder/decoder parameter changes;

allocating a queue in memory to receive both a newly transmitted audio packet and a re-transmitted audio packet that are transmitted together;

receiving both the newly transmitted audio packet and the re-transmitted audio packet;

stopping the lost audio packet process; and resetting a decoder to accept a plurality of new audio data packets transmitted by the sending station.

7. The method as recited in claim 6, further comprising the step of:

if the re-transmitted audio packet is a duplicate of a packet that has already been received, discarding the re-transmitted audio packet.

8. The method as recited in claim 6, further comprising the step of:

if the re-transmitted audio packet is too old and not useable with the current set of received audio packets, discarding the re-transmitted audio packet.

9. The method as recited in claim 6, further comprising the step of:

if the re-transmitted audio packet is one that was lost, reinserting the re-transmitted audio packet in an appropriate position among the other audio packets to produce an acceptable audio signal.

10. An apparatus for recovering lost packets representing audio data in a network environment, comprising:

a sender/receiver unit including:

a receiver; and means for sending data, the sender/receiver unit communicating with a remote sender/receiver unit in the network, the receiver causing the sender/receiver unit to receive a new packet from the remote sender/receiver unit, wherein the packet contains a packet index, wherein the packet index is the numerical value that identifies the order of transmission for the packet; the receiver being further configured to perform steps, including:

storing a packet index of a last packet previously received in memory, comparing the stored packet index and the packet index of the new packet to yield a difference;

starting, if the difference is greater than one, an adjustment timer and a counter to determine the number of lost audio packets for a specific period of time;

initiating a lost audio packet recovery procedure, if the adjustment timer and the counter show that the number of lost packets counted by the counter exceeds a predetermined threshold for the number of lost audio packets for the time specified by the adjustment timer; and causing the sender/receiver unit to forward lost audio packet recovery information to the remote sender/receiver unit as part of the lost audio packet recovery procedure.

11. The apparatus as recited in claim 10, wherein the receiver considers the newly received audio packet out-of-sequence and discards the newly received packet, if the difference exceeds one half the value of the span of possible packet index values.

12. The apparatus as recited in claim 10, wherein the receiver terminates the lost audio packet recovery process if the adjustment timer reaches the specified time and the count is under a predetermined threshold for a predetermined period of time.

13. The apparatus as recited in claim 10, wherein the receiver terminates the lost audio packet recovery process, if the number of lost audio packets counted by the counter during the time specified by the adjustment timer is under a predetermined threshold.

14. The apparatus as recited in claim 10, in which the receiver is further configured to perform steps, including:

causing the sender/receiver unit to send a request to the remote sender/receiver unit for encoder/decoder parameters changes;

allocating a queue in memory to receive both a newly transmitted audio packet and a retransmitted audio packet that are transmitted together;

causing the sender/receiver unit to receive both the newly transmitted audio packet and the re-transmitted audio packet;

stopping the lost audio packet recovery process; and resetting a decoder to accept a plurality of new audio data packets transmitted by the remote sender/receiver unit.

15. The apparatus as recited in claim 14, wherein the receiver discards the re-transmitted audio packet, if the re-transmitted audio packet is a duplicate of a packet that has already been received.

16. The apparatus as recited in claim 14, wherein the receiver discards the re-transmitted audio packet, if the re-transmitted audio packet is too old and not useable with the current set of received audio packets.

17. The apparatus as recited in claim 14, wherein receiver inserts the re-transmitted audio packet in an appropriate position among the other audio packets to produce an acceptable audio signal, if the re-transmitted audio packet is one that was previously lost.

18. A system for recovering lost packets representing audio data in a network environment, comprising:

first and second sender/receiver units communicating with each other and being configured for both transmitting and receiving packets representing audio data, each packet containing a index to uniquely identify the packet;

means for causing the first sender/receiver unit to start a counter and an adjustment timer to determine a number of lost packets for a specified time period, if a difference between the index of a new packet and the index of a last previous packet is greater than one; and means for causing the first sender/receiver unit to initiate a lost packet recovery procedure when the number of lost packets for the specified period exceeds a predetermined threshold, the lost packet recovery procedure includes sending a lost packet recovery information;

means for causing the second sender/receiver unit to receive the lost packet recovery information;

means for causing the second sender/receiver unit to provide a compression method suitably selected for recovery of the lost packets;

means for causing the first sender/receiver unit to prepare for recovering any lost packets, a lost packet being resent in tandem with a newly sent packet; and means for causing both of the first and second sender/receiver units to stop the lost packet recovery procedure when the number of lost packets is under a specified threshold.

19. A method for recovering lost packets representing audio data in a network environment comprising:

receiving, by a receiver, packets representing audio data, each packet containing a index to uniquely identify the packet;

counting, in the receiver, a number of lost packets for a specified time period if a difference between the index of a previously received packet and the index of a currently received packet is greater than one;

initiating, by the receiver, a lost packet recovery procedure when the number of lost packets for the specified period exceeds a predetermined threshold, the lost packet recovery procedure includes sending, from the receiver to a sender, a lost packet recovery information;

providing, in the sender, a compression method suitably selected for recovery of the lost packets;

preparing, in the receiver, to recover any lost packets resent by the sender, for each lost packet resent by the sender the lost packet is sent in tandem with a new packet; and sending from the receiver to the sender a stop recovery message when the number of lost packets is under a specified threshold.

* * * * *